(12) United States Patent
Hayashi et al.

(10) Patent No.: US 9,634,360 B2
(45) Date of Patent: Apr. 25, 2017

(54) ALL-SOLID-STATE SECONDARY CELL

(75) Inventors: Akitoshi Hayashi, Osaka (JP); Masahiro Tatsumisago, Osaka (JP)

(73) Assignee: Japan Science and Technology Agency, Saitama (JP)

( * ) Notice: Subject to any disclaimer, the term of this patent is extended or adjusted under 35 U.S.C. 154(b) by 97 days.

(21) Appl. No.: 14/234,118

(22) PCT Filed: Jul. 25, 2012

(86) PCT No.: PCT/JP2012/068852
§ 371 (c)(1),
(2), (4) Date: Jan. 21, 2014

(87) PCT Pub. No.: WO2013/015321
PCT Pub. Date: Jan. 31, 2013

(65) Prior Publication Data
US 2014/0154585 A1 Jun. 5, 2014

(30) Foreign Application Priority Data
Jul. 26, 2011 (JP) .................................. 2011-163257

(51) Int. Cl.
*H01M 10/0562* (2010.01)
*H01M 10/39* (2006.01)
*H01M 4/58* (2010.01)

(52) U.S. Cl.
CPC ..... *H01M 10/3918* (2013.01); *H01M 4/5815* (2013.01)

(58) Field of Classification Search
CPC .......................... H01M 10/3918; H01M 4/5815
See application file for complete search history.

(56) References Cited

U.S. PATENT DOCUMENTS 4,542,108 A * 9/1985 Susman et al. ................. 501/40
2009/0325072 A1* 12/2009 Maeda et al. ................ 429/220
(Continued)

FOREIGN PATENT DOCUMENTS

| JP | 2002-334715 | 11/2002 |
| JP | 2004-103421 | 4/2004 |

(Continued)

OTHER PUBLICATIONS

Noi, K. et al., "Mechanochemical Synthesis of Ion Conducting Na2S—P2S5 Glasses and Their Crystallization," Abstracts of Presentations at the 36th Symposium on Solid State Ionics in Japan, p. 120, 2010.

(Continued)

*Primary Examiner* — Nicholas P D'Aniello
*Assistant Examiner* — Jimmy K Vo
(74) *Attorney, Agent, or Firm* — Stites & Harbison, PLLC; Terry L. Wright; Jeffrey A. Haeberlin

(57) ABSTRACT

An all-solid-state secondary cell is provided comprising at least a positive electrode, a negative electrode and a solid electrolyte layer which is positioned between the positive electrode and the negative electrode. The positive electrode contains a positive electrode active material consisting of $Na_2S_x$ (x=1 to 8) and the solid electrolyte layer contains an ion conductive glass ceramics represented by a formula (I): $Na_2S\text{-}M_xS_y$, wherein M is P, Si, Ge, B or Al; x and y each is an integer giving a stoichiometric ratio depending upon the type of M; and $Na_2S$ is contained in an amount of more than 67 mole % and less than 80 mole %.

5 Claims, 11 Drawing Sheets

(56) References Cited

U.S. PATENT DOCUMENTS

2010/0040952 A1* 2/2010 Kimura et al. ............... 429/245
2012/0021273 A1 1/2012 Ohmori et al.
2012/0258359 A1 10/2012 Saka

FOREIGN PATENT DOCUMENTS

| JP | 2010-225525 | 10/2010 |
| JP | 2011-009202 | 1/2011 |
| JP | 2011-060649 A | 3/2011 |
| JP | 2011-096470 A | 5/2011 |
| JP | 2011-134550 | 7/2011 |
| WO | WO 2008117549 A1 * | 10/2008 |

OTHER PUBLICATIONS

JPO, International Search Report issued in corresponding international application No. PCT/JP2012/068852, mailed Sep. 11, 2012.
K. Noi, et al., "Preparation and Characterization of Sodium Ion Conducting Na2S—P2S5 Glass-ceramic Solid Electrolytes," The Meeting on the Electrochemical Society of Japan, Mar. 29, 2011, vol. 78th, 1B19.
K. Noi, et al., "Preparation and Characterization of Glass-ceramic Solid Electrolytes in the system Na2S—P2S5," The 13th Meeting on Material for Chemical Batteries in Japan, Extended Abstracts, Jun. 7, 2011, p. 67-68.

* cited by examiner

ALL-SOLID-STATE SECONDARY CELL

TECHNICAL FIELD

The present invention relates to an all-solid-state secondary cell (battery). More particularly, it relates to an all-solid-state secondary cell being at low cost and having high capacity where abundant sodium resources are the background.

BACKGROUND ART

Since a lithium secondary cell has high voltage and high capacity, it has been widely used as an electric source for mobile phones, digital cameras, video cameras, notebook computers, electric cars, etc. The lithium secondary cell which is commonly circulated uses a liquid electrolyte where electrolytic salt as an electrolyte is dissolved in a non-aqueous solvent. Since the non-aqueous solvent contains much combustible solvent, there has been a demand for securing its safety.

Further, in recent years, demand for the lithium secondary cell has been increasing for storing the electric power in generating devices in cars (such as electric car and hybrid car), solar battery, wind power generation, etc. However, since the lithium secondary cell uses lithium wherein the estimated deposit amount is small and the producing places are unevenly distributed, there is an anxiety that the demand exceeds the supply and there is also a problem of high cost.

For solving the above problem, as an all-solid-state secondary cell using no solvent, a sodium-sulfur cell (NAS cell) which is a kind of sodium secondary cell has been receiving public attention as a big-size cell for storage of electric power.

Since the NAS cell is operated at the temperature of as high as not lower than 300° C., careful attention is needed for the handling of sodium in a liquid state and there has been a problem in terms of its safety.

Moreover, in the NAS cell, β-alumina is used as its sodium ion-conductive solid (electrolyte). β-Alumina shows a sodium ion conductivity of not less than $10^{-3}$ Scm$^{-1}$ at room temperature [Document: X. Lu et al., Journal of Power Sources, 195 (2010) 2431-2442]. However, for the production of β-alumina, burning at the temperature of as high as not lower than 1600° C. is necessary and there is a problem that its solid interfacial adhesion to a positive electrode active material is difficult.

Accordingly, in order to provide a highly safe all-solid-state secondary cell, there has been a demand for lowering the operating temperature to about room temperature. In addition, a material which does not need the burning at high temperature and shows high conductivity as a molded product of powder being produced merely by means of press is important for the interfacial constitution comprising a positive electrode and an electrolyte for an all-solid-state secondary cell of a low-temperature operation type.

In view of the above, the inventors of the present invention have proposed to use $Na_2S$—$P_2S_5$ glass ceramics as a solid electrolyte (Abstracts of Presentations at the 36th Symposium on Solid State Ionics in Japan, (2010) page 120).

PRIOR ART DOCUMENT

Non-Patent Document

Non-Patent Document 1: Abstracts of Presentations at the 36th Symposium on Solid State Ionics in Japan, (2010) page 120.

SUMMARY OF THE INVENTION

Problems that the Invention is to Solve

In the above document, the solid electrolyte having a sufficiently conductive is obtained. However, since the sodium all-solid-state secondary cell of a low-temperature operating type is a very new technique, there is still enough ground for consideration in selecting a positive electrode active material which is necessary for actually assembling into the cell.

In selecting the positive electrode active material, there are various standards. One of said standards is capacity of the cell. When capacity of the cell becomes large, it is possible to store the electric power in large amount even if the cell is small whereby its industrial value is high.

Accordingly, it is a problem to solve by the present invention to provide a combination of the solid electrolyte made of glass ceramics constituted from $Na_2S$ and sulfide with the positive electrode active material by which capacity of a cell can be enhanced in the sodium all-solid-state secondary cell of a low-temperature operating type.

Means for Solving the Problems

As a result of earnest investigations, the inventors of the present invention found that, when $Na_2S_x$ is used as the positive electrode active material, an all-solid-state secondary cell of high capacity can be provided and they have achieved the present invention. Incidentally, so far as the present inventors are aware of, there is no document reporting that the capacity is specifically enhanced by means of a combination of $Na_2S_x$ as the positive electrode active material with glass ceramics constituted from a $Na_2S$ and a sulfur compound as the solid electrolyte.

Thus, in accordance with the present invention, there is provided an all-solid-state secondary cell comprising at least a positive electrode, a negative electrode and a solid electrolyte layer which is positioned between the positive electrode and the negative electrode, wherein:

the positive electrode contains an positive electrode active material consisting of a $Na_2S_x$ (x=1 to 8) and the solid electrolyte layer contains an ion conductive glass ceramics represented by a formula (I): $Na_2S$-$M_xS_y$, wherein M is selected from P, Si, Ge, B and Al; x and y each is an integer giving a stoichiometric ratio depending upon the type of M; and $Na_2S$ is contained in an amount of more than 67 mole % and less than 80 mole %.

Effect of the Invention

In accordance with the present invention, it is now possible to provide a sodium all-solid-state secondary cell having high capacity of a low-temperature operating type which is not dependent on the resource amount of lithium.

Further, as a result of any of or a combination of the followings, the sodium all-solid-state secondary cell of a low-temperature operating type having higher capacity can be provided:

$Na_2S_x$ is $Na_2S$;

$Na_2S-M_xS_y$ is $Na_2S-P_2S_5$;

$Na_2S-P_2S_5$ contains $Na_2S$ in an amount of more than 67 mole % and less than 80 mole %;

The ion conductive glass ceramics has a state where crystal parts are dispersed in the glass ingredient of an amorphous state;

The crystal parts are contained in an amount of 50% by weight or more to the ion conductive glass ceramics as a whole; and The positive electrode further contains $Na_2S-M_xS_y$ to be used for the solid electrolyte layer and the positive electrode active material is contained in an amount of within a range of 10 to 90% by weight in the positive electrode.

MODE FOR CARRYING OUT THE INVENTION

Figure 1:
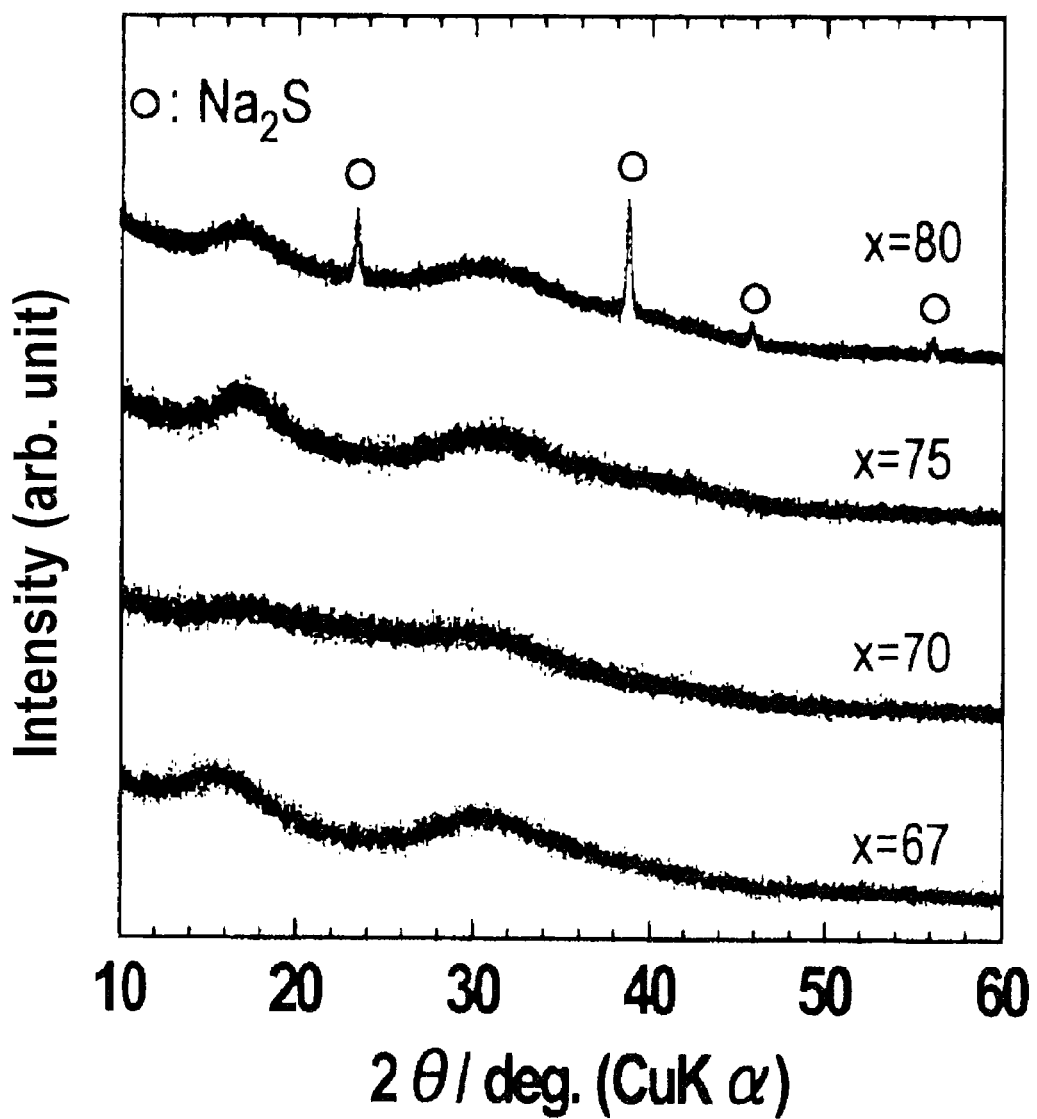
FIG. 1 is a XRD pattern of the glass in Example 1.

The all-solid-state secondary cell of the present invention (sodium all-solid-state secondary cell of a low-temperature operating type) is equipped with at least a positive electrode, a negative electrode and a solid electrolyte layer which is positioned between the positive electrode and the negative electrode. Here, "low temperature" means the temperature where charge and discharge are possible and it is lower than the melting point of the components constituting the all-solid-state secondary cell and, for example, it means the range of 0 to 100° C. Further, the term "all-solid-state secondary cell" means a secondary cell containing the electrolyte free of solvent in the cell.

(Positive Electrode)

The positive electrode contains a positive electrode active material comprising $Na_2S_x$ (x=1 to 8). This positive electrode active material is common to a substance which is able to be contained in the solid electrolyte layer. Therefore, between the positive electrode and the solid electrolyte layer, formation of non-contacting interface of them can be prevented and a conductive path for the transfer of Na in the positive electrode active material to the solid electrolyte layer during the charge can be easily formed. There is an additional advantage that the amount of Na to be transferred to the solid electrolyte layer can be made abundant.

As to $Na_2S_x$, a sulfide such as $Na_2S$, $Na_2S_2$, $Na_2S_3$, $Na_2S_4$ or $Na_2S_8$ may be exemplified. As to the sulfides as such, either one of them or a mixture thereof may be used. Among those sulfides, $Na_2S$, $Na_2S_2$ and $Na_2S_4$ are preferred and $Na_2S$ is more preferred.

The positive electrode active material may contain an active material other than $Na_2S$. Examples thereof are various transition metal oxides such as $Na_{0.44}MnO_2$, $NaNi_{0.5}Mn_{0.5}O_2$, $FeS$, $TiS_2$, $Mo_6S_8$, $MoS_2$, $NaCoO_2$, $NaFeO_2$, $NaCrO_2$, $Na_3V_2(PO_4)_3$ and $NaMn_2O_4$.

The positive electrode may be composed of only the positive electrode active material or may be mixed with a binder, a conductive agent, an electrolyte, etc. Content of $Na_2S$ in the positive electrode is preferred to be within a range of 10 to 90% by weight. When the content is less than 10% by weight, it is hard to obtain the all-solid-state secondary cell of high capacity. When the content is more than 90% by weight, amount of Na which does not contribute in a cell reaction becomes high whereby the utilizing rate of the positive electrode active material may lower. The content may, for example, be 10% by weight, 20% by weight, 30% by weight, 40% by weight, 50% by weight, 60% by weight, 70% by weight, 80% by weight or 90% by weight. More preferred content is within a range of 25 to 75% by weight.

As to the binder, there may be exemplified polyvinylidene fluoride, polytetrafluroethylene, polyvinyl alcohol, polyvinyl acetate, polymethyl methacrylate and polyethylene.

As to the conductive agent, there may be exemplified natural graphite, artificial graphite, acetylene black, Ketjenblack, Denka black, carbon black and vapor-grown carbon fiber (VGCF).

As to the electrolyte, there may be exemplified an electrolyte used for the solid electrolyte layer which will be mentioned later.

The positive electrode may be prepared as pellets by, for example, mixing the positive electrode active material optionally with the binder, the conductive agent, the electrolyte, etc. followed by pressing the resulting mixture. Here, in mixing the conductive agent and the electrolyte with the positive electrode active material, there is no particular limitation for a mixing means. Thus, there may be exemplified a mixing using a mortar and a mixing by means of mechanical milling. Particularly in mixing the electrolyte with other ingredient, it is preferred to be conducted by means of a mechanical milling by which it is possible to mix more uniformly.

The positive electrode may be formed on a collector such as stainless steel, Al or Cu.

(Solid Electrolyte Layer)

The solid electrolyte layer contains an ion-conductive glass ceramics represented by the formula (I): $Na_2S-M_xS_y$, wherein M is selected from P, Si, Ge, B and Al; x and y each is an integer giving a stoichiometric ratio depending upon the type of M; and $Na_2S$ is contained in an amount of more than 67 mole % to less than 80 mole %. Specific examples of the glass ceramics are $Na_2S-P_2S_5$, $Na_2S-SiS_2$, $Na_2S-GeS_2$, $Na_2S-B_2S_3$ and $Na_2S-Al_2S_3$. Among them, $Na_2S-P_2S_5$ is particularly preferred. Further, another ion-conductive material such as NaI or $Na_3PO_4$ may also be added thereto. The amount of the ion-conductive glass ceramics in the solid electrolyte layer is preferably 90% by weight or more and, more preferably, the total amount.

In addition, $Na_2S-M_xS_y$ contains $Na_2S$ in an amount of more than 67 mole % and less than 80 mole %. When the amount is within this range, ion conductivity can be enhanced as compared with the corresponding glass. The rate of $Na_2S$ may, for example, be 79 mole %, 70 mole %, 60 mole %, 50 mole %, 40 mole %, 30 mole %, 20 mole % or 10 mole %. It is more preferred to contain more than 70 mole % and less than 80 mole % of $Na_2S$ and it is still more preferred to contain 73 to 77 mole % of $Na_2S$.

The ion-conductive glass ceramics may be in such a state where crystal part is dispersed in a glass ingredient of an amorphous state. The rate of the crystal part to the whole glass ceramics is preferably 50% by weight or more and, more preferably, 80% by weight or more. This rate may, for example, be by 50% by weight, 60% by weight, 70% by weight, 80% by weight or 90% by weight. The rate of the crystal part can be measured by means of a solid NMR.

Incidentally, in the glass ceramics, it is preferred that there is no glass transition point which was present in the corresponding glass.

Thickness of the solid electrolyte layer is preferably 1 to 1000 μm and, more preferably, 1 to 200 μm. This thickness may, for example, be 100 μm, 200 μm, 300 μm, 400 μm, 500 μm, 600 μm, 700 μm, 800 μm, 900 μm or 1000 μm. The solid electrolyte layer may, for example, be prepared in pellets by pressing the material thereof.

A process for producing the above ion-conductive glass ceramics includes, for example, the following step.

(i) a step where a material mixture containing $Na_2S$ and $M_xS_y$ in a predetermined rate for giving the formula (I): $Na_2S$-$M_xS_y$ is subjected to a mechanical milling treatment to give glass; and (ii) a step where glass is converted to the ion-conductive glass ceramics by subjecting the glass to a heat treatment at the temperature of a glass transition point or higher.

(1) Step (i)

In the mechanical milling treatment in the step (i), there is no particular limitation for its treating device and treating condition so far as the materials can be well mixed and made to react.

As to a treating device, a ball mill may be usually used. The ball mill is preferred since a big mechanical energy can be obtained thereby. Among the ball mill, a preferred one is a planet-type ball mill since a pot rotates on its axis while a stand plate revolves around whereby high impact energy can be efficiently generated.

A treating condition may be appropriately set depending upon the treating device used therefor. For example, when a ball mill is used, the materials can be more uniformly mixed and made to react if the revolving velocity is higher and/or the treating time is longer. Incidentally, the term reading "and/or" means A, B or, A and B when expressed as A and/or B. To be more specific, when the planet-type ball mill is used, such a condition where revolving velocity of 50 to 600 revolutions per minute, treating time of 0.1 to 50 hour(s) and 1 to 100 kWh for 1 kg of a material mixture may be exemplified. The revolving velocity may, for example, be 50 rpm, 100 rpm, 200 rpm, 300 rpm, 400 rpm, 500 rpm or 600 rpm. The treating time may, for example, be 0.1 hour, 10 hours, 20 hours, 30 hours, 40 hours or 50 hours. Electric power for the treatment may, for example, be 6 kWh/1 kg of material mixture, 10 kWh/1 kg of material mixture, 20 kWh/1 kg of material mixture, 30 kWh/1 kg of material mixture, 40 kWh/1 kg of material mixture, 50 kWh/1 kg of material mixture or 60 kWh/1 kg of material mixture. More preferred treating condition may be revolving velocity of 200 to 500 rpm, treating time of 1 to 20 hour(s) and 6 to 50 kWh for 1 kg of the material mixture.

(2) Step (ii)

The glass obtained in the above step (i) is subjected to a heat treatment to convert to the ion-conductive glass ceramics. This heating treatment is carried out at a temperature which is a glass transition point or higher.

The glass transition point ($T_g$) varies depending upon the ratio of $Na_2S$ to $M_xS_y$ and, in the case of $Na_2S$—$P_2S_5$ for example, it is within a range of 180 to 200° C. $T_g$ may, for example, be 180° C., 185° C., 190° C., 195° C. or 200° C. The first crystallizing temperature ($T_c$) is within a range of 190 to 240° C. $T_c$ may, for example, be 190° C., 200° C., 210° C., 220° C., 230° C. or 240° C. Although the upper limit of the temperature for the heat treatment is not particularly limited, it is usually the first crystallizing temperature+100° C.

The heat treatment time is the time by which the glass can be converted to the ion-conductive glass ceramics and, when the heat treatment temperature is high or low, the time becomes short or long, respectively. The time for heat treatment is usually within a range of 0.1 to 10 hour(s). The time for heat treatment may, for example, be 0.1 hour, 3 hours, 5 hours, 7 hours, 9 hours or 10 hours.

There is no particular limitation for the negative electrode. The negative electrode may comprise a negative electrode active material only or may be mixed with a binder, a conductive agent, an electrolyte, etc.

As to the negative electrode active material, there may be exemplified metal (such as Na, In or Sn), Na alloy, graphite, hard carbon and various transition metal oxides (such as $Li_{4/3}Ti_{5/3}O_4$, $Na_3V_2(PO_4)_3$ and SnO). A range of the rate of the negative electrode active material in the negative electrode may be set at about the same range of the rate of the positive electrode active material in the positive electrode.

As to the binder, the conductive agent and the electrolyte, any of them listed in the above column for the positive electrode may be used.

The negative electrode may be obtained in pellets by, for example, mixing the negative electrode active material with the binder, the conductive agent, the electrolyte, etc. followed by pressing the resulting mixture. When a metal sheet (foil) is used as the negative electrode active material comprising metal or alloy thereof, it may be used just as it is.

The negative electrode may be formed on a collector such as stainless steel, Al or Cu.

(Process for Production of all-Solid-Phase Secondary Cell)

The all-solid-phase secondary cell may, for example, be produced by layering the positive electrode, the solid electrolyte layer and the negative electrode followed by pressing.

EXAMPLES

Although the present invention will be more specifically illustrated by way of the following Examples, it is not limited by those Examples at all.

Example 1

Production of Solid Electrolyte Layer

Step (i): Mechanical Milling Treatment $Na_2S$ (manufactured by Aldrich; purity: 99%) and $P_2S_5$ (manufactured by Aldrich; purity: 99%) in a mole ratio of 67:33, 70:30, 75:25 or 80:20 were poured into a planet-type ball mill. After pouring, a mechanical milling treatment was carried out to give $67Na_2S$-$33P_2S_5$, $70Na_2S$-$30P_2S_5$, $75Na_2S$-$25P_2S_5$ or $80Na_2S$-$20P_2S_5$, respectively.

As to the planet-type ball mill, Pulverisette P-7 manufactured by Fritsch was used where pot and ball were made of $ZrO_2$ and a mill where 500 balls of 4 mm diameter were placed in a 45-ml pot was used. The mechanical milling treatment was carried out for 20 hours at the revolving velocity of 510 rpm and room temperature in a glove box of a dry nitrogen atmosphere.

In the meanwhile, the above production process was in accordance with the description in "*Experimental*" in Akitoshi Hayashi, et al., Journal of Non-Crystalline Solids, 356 (2010), pages 2670 to 2673.

When 80 mg of each of the above four kinds of $Na_2S$—$P_2S_5$ was pressed (pressure: 370 $MPa/cm^2$), there were produced pellets of 10 mm diameter and about 1 mm thickness.

Figure 2:
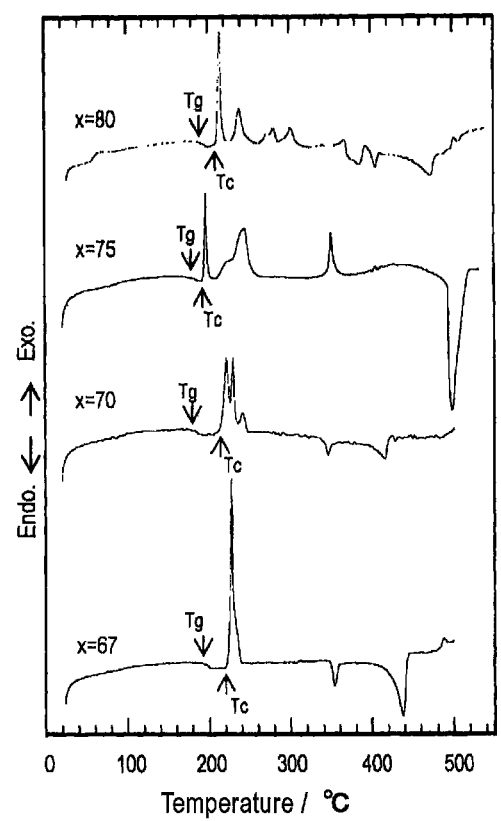
FIG. 2 is a DTA curve of the glass in Example 1.
Figure 3:
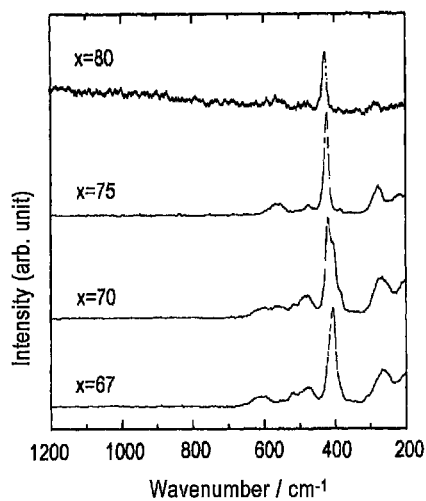
FIG. 3 is a Raman spectrum of the glass in Example 1.
Figure 4:
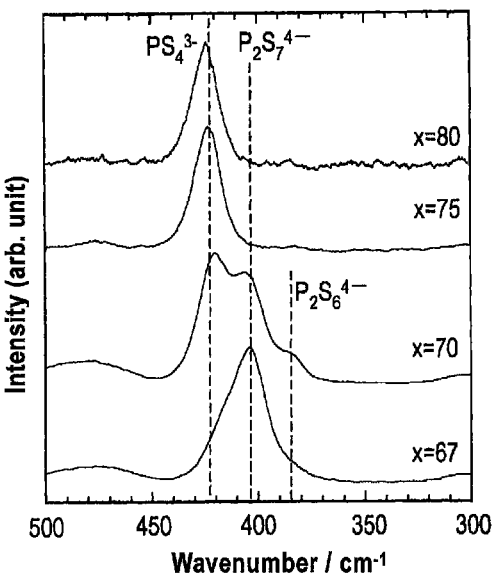
FIG. 4 is partial expansion of FIG. 3.
Figure 5:
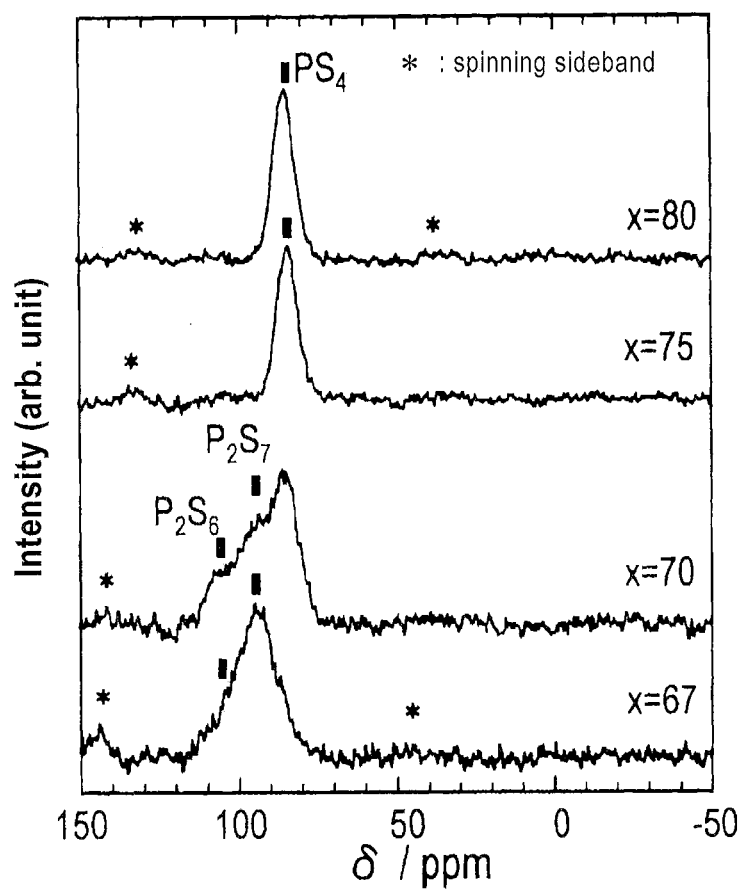
FIG. 5 is $^{31}$PMAS-NMR of the glass in Example 1.

With regard to the resulting glass, its XRD pattern is shown in FIG. 1, DTA curve is shown in FIG. 2, Raman spectrum is shown in FIG. 3, partial expansion of FIG. 3 is shown in FIG. 4 and $^{31}$PMAS-NMR is shown in FIG. 5.

From FIG. 1, it is shown that an amorphous material was prepared in the case of $67Na_2S$-$33P_2S_5$, $70Na_2S$-$30P_2S_5$ and $75Na_2S$-$25P_2S_5$ and that, in the case of $80Na_2S$-$20P_2S_5$, a part of $Na_2S$ remained in addition to the amorphous thing.

From FIG. 2, the glass transition point was confirmed in all of $67Na_2S$-$33P_2S_5$, $70Na_2S$-$30P_2S_5$, $75Na_2S$-$25P_2S_5$ and $80Na_2S$-$20P_2S_5$ whereby it is noted that those amorphous materials are in a state of glass. Incidentally, the glass transition point is between 180° C. and 200° C.

From FIG. 3 and FIG. 4, peaks derived from $P_2S_7^{4-}$ were mostly noted in the case of $67Na_2S$-$33P_2S_5$. In the case of $70Na_2S$-$30P_2S_5$, peaks derived from $P_2S_7^{4-}$ decreased as the rate of $Na_2S$ increased and, in place of such peaks, the peaks derived from $PS_4^{3-}$ increased; and, in the cases of $75Na_2S$-$25P_2S_5$ and $80Na_2S$-$20P_2S_5$, peaks derived from $PS_4^{3-}$ were mostly noted. Incidentally, the fact that assignments of peaks in FIG. 3 and FIG. 4 were derived from $PS_4^{3-}$, $P_2S_7^{4-}$ and $P_2S_6^{4-}$ was analogized from the data in an $Li_2S$—$P_2S_5$ system since no data in an $Na_2S$—$P_2S_5$ were available. To be more specific, $PS_4^{3-}$, $P_2S_7^{4-}$ and $P_2S_6^{4-}$ were analogized as 419 $cm^{-1}$, 406 $cm^{-1}$ and 382 $cm^{-1}$, respectively.

In FIG. 5, the same tendency as in FIGS. 3 and 4 was noted as well.

Step (ii): Heat Treatment

Figure 6:
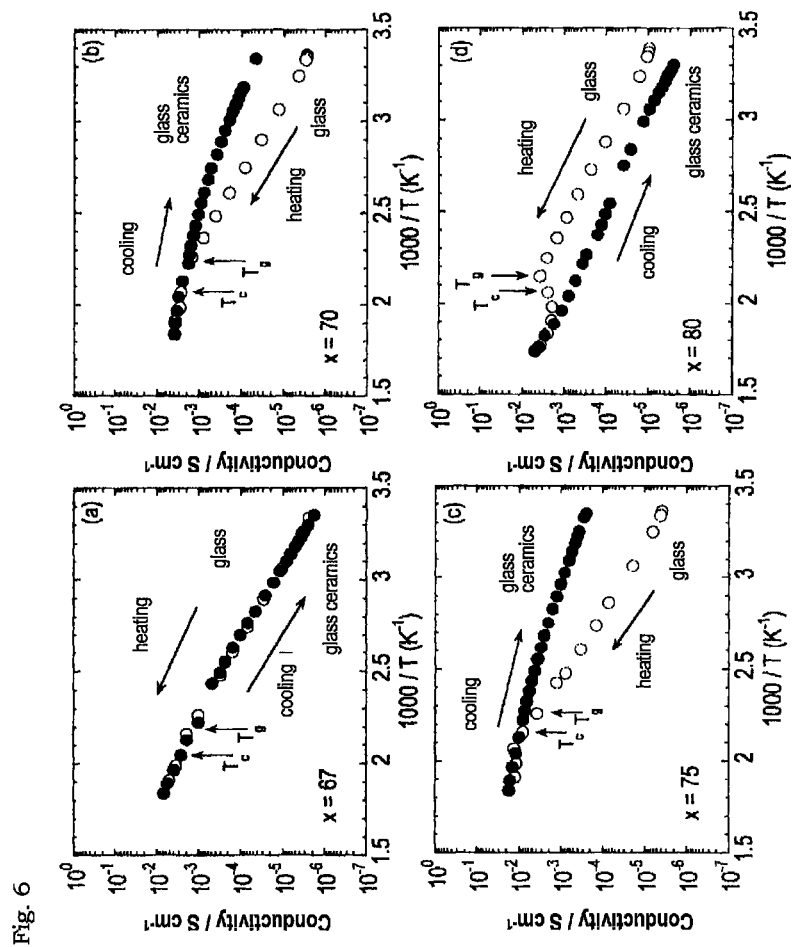
FIGS. 6(a) to (d) are graphs showing the temperature dependency of electric conductivity of the glass and the glass ceramics in Example 1.

Pellets comprising each of the above-mentioned four kinds of glass were heated starting from room temperature (25° C.) to 280° C. (not lower than crystallizing temperature) so that the glass was made into the glass ceramics. Further, after reaching 280° C., the glass ceramics was cooled down to room temperature to give the solid electrolyte layer (70 mg) of 10 mm diameter and 1 mm thickness. During this heating and cooling cycle, electric conductivity of the pellet was measured every about 15° C. Results of the measurement are shown in FIGS. 6(*a*) to (*d*). In the drawings, black dots show the glass ceramics and open circles show the glass.

From FIG. 6(*a*), it is shown that, in $67Na_2S$-$33P_2S_5$, there is almost no difference in terms of electric conductivity between the glass state and the glass ceramics state. From FIGS. 6(*b*) to (*d*), it is shown that, in $70Na_2S$-$30P_2S_5$, $75Na_2S$-$25P_2S_5$ and $80Na_2S$-$20P_2S_5$, differences were resulted in terms of electric conductivity between the glass state and the glass ceramics state. Particularly in the former two cases, the glass ceramics state shows higher electric conductivity than the glass state.

Figure 7:
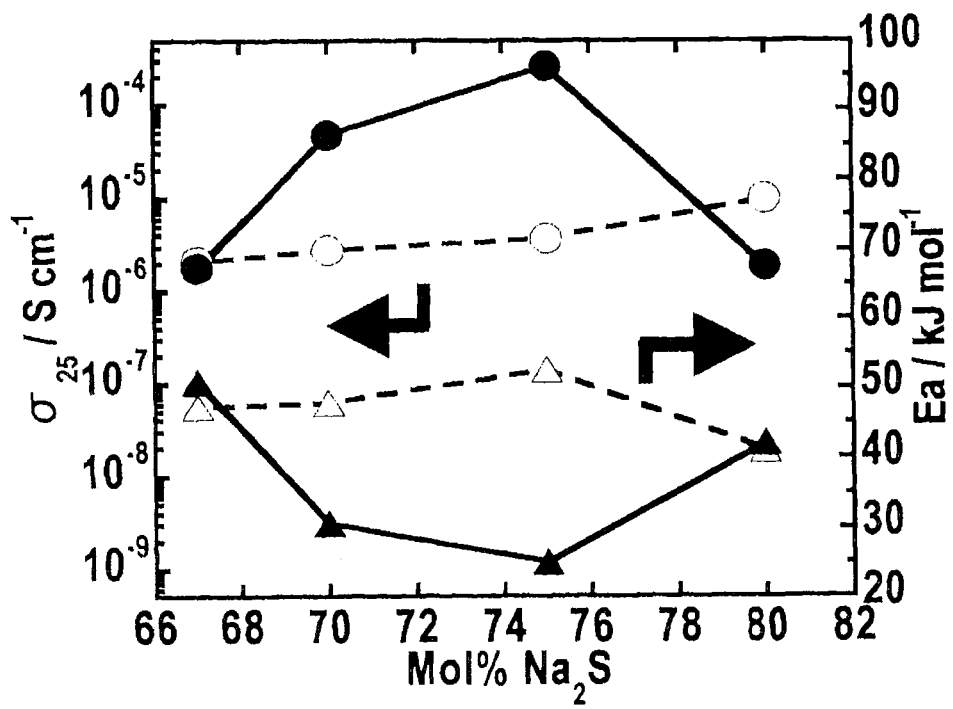
FIG. 7 is a graph showing the electric conductivity and the conduction activation energy, under room temperature, of the glass and the glass ceramics in Example 1.

In addition, the result where activation energies (Ea) of conductance of glass and glass ceramics were measured is shown in Table 1 together with the data of electric conductivity at room temperature. In Table 1, G means the glass and GC means the glass ceramics. Further, the result of Table 1 is collectively shown in FIG. 7. In FIG. 7, black dots and black triangles stand for the glass ceramics while open circles and open triangles stand for the glass.

TABLE 1

| mole ratio % of $Na_2S$ | electric conductivity $Scm^{-1}$ | | conduction activation energy $kJmol^{-1}$ | |
|---|---|---|---|---|
| | G | GC | G | GC |
| 67 | $2.1 \times 10^{-6}$ | $1.8 \times 10^{-6}$ | 47 | 51 |
| 70 | $2.8 \times 10^{-6}$ | $4.7 \times 10^{-5}$ | 48 | 31 |
| 75 | $3.7 \times 10^{-6}$ | $2.6 \times 10^{-4}$ | 53 | 25 |
| 80 | $9.9 \times 10^{-6}$ | $1.9 \times 10^{-6}$ | 41 | 42 |

From FIG. 7 and Table 1, it is noted that the electric conductivity and the activation energy of conduction are different between the glass state and the glass ceramics state.

Figure 8:
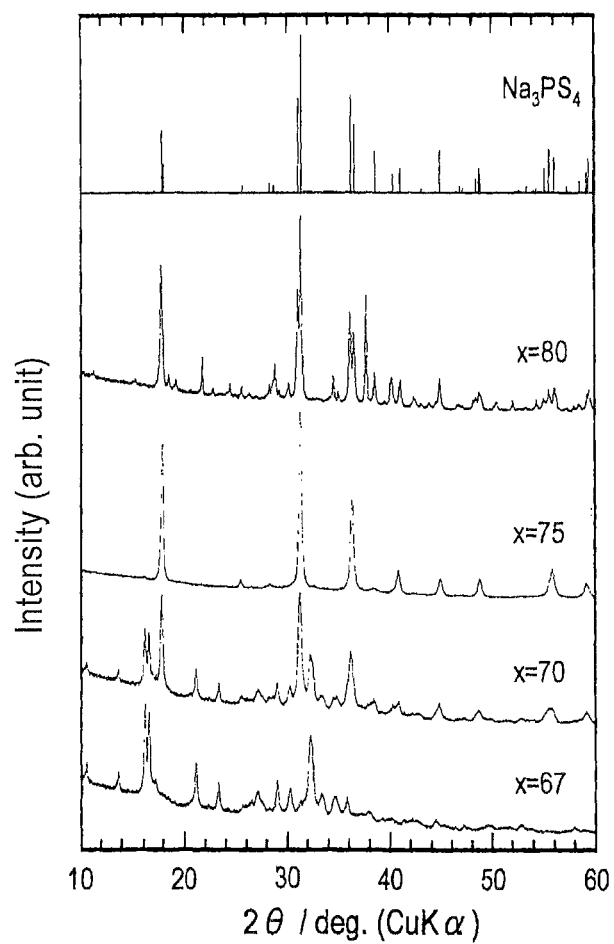
FIG. 8 is a XRD pattern of the glass ceramics in Example 1.
Figure 9:
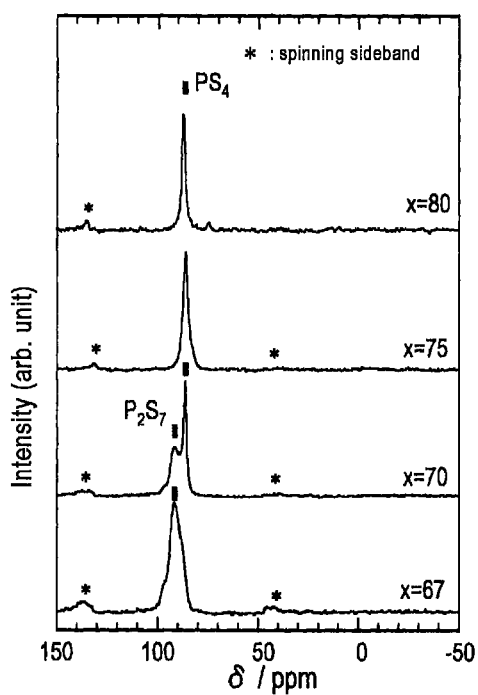
FIG. 9 is $^{31}$PMAS-NMR of the glass ceramics in Example 1.

XRD patterns and $^{31}$PMAS-NMR of $67Na_2S$-$33P_2S_5$, $70Na_2S$-$30P_2S_5$, $75Na_2S$-$25P_2S_5$ and $80Na_2S$-$20P_2S_5$ after the heat treatment are shown in FIG. 8 and FIG. 9, respectively. FIG. 8 also shows XRD pattern of $Na_3PS_4$ crystals (tetragonal) published in the following document A.

Document A: M. Jansen, et al., Journal of Solid State Chemistry, 92(1992), 110.

It is noted from FIG. 8 that four kinds of $Na_2S$—$P_2S_5$ are in the glass ceramics state because of the presence of peaks derived from crystal structure as compared with FIG. 1. It is also noted from FIG. 8 that, although the same peak pattern as $Na_3PS_4$ crystals is available in $80Na_2S$-$20P_2S_5$, separation of crystals which are different from $Na_3PS_4$ crystals is predicted since the presence of a pattern which is different from $Na_3PS_4$ crystals is observed as mole % of $Na_2S$ becomes small. Particularly in the case of $75Na_2S$-$25P_2S_5$, although a pattern is noted at the 2θ position similar to the pattern of tetragonal $Na_3PS_4$, no fission of the peak is noted whereby it is likely that tetragonal $Na_3PS_4$ is present. Further, in $67Na_2S$-$33P_2S_5$, no identification of crystals is possible and separation of unknown crystals is predicted. It is also found that, in $70Na_2S$-$30P_2S_5$, a pattern which is the sum of the patterns of $67Na_2S$-$33P_2S_5$ and $75Na_2S$-$25P_2S_5$ is resulted.

From FIG. 9, peaks derived from $PS_4^{3-}$ are mostly noted in $75Na_2S$-$25P_2S_5$ and $80Na_2S$-$20P_2S_5$ and peaks derived from $P_2S_7^{4-}$ are mostly noted in $67Na_2S$-$33P_2S_5$. In $70Na_2S$-$30P_2S_5$, both peaks derived from $PS_4^{3-}$ and $P_2S_7^{4-}$ are noted.

(Production of Positive Electrode)

$Na_2S$ as a positive electrode active material, acetylene black (HS-100 manufactured by Denki Kagaku Kogyo of Japan) as a conductive agent and the glass ceramics made by the above $75Na_2S$-$25P_2S_5$ as a solid electrolyte were weighed in the ratio of 25:25:50% by weight (total weight: 15.5 mg).

The positive electrode active material and a conductive agent were mixed using a mortar for 10 minutes. After that, the resulting two-ingredient mixture was subjected to the mechanical milling treatment the same as above together with the solid electrolyte. The resulting three-ingredient mixture was pressed to give a positive electrode of 10 mm diameter and 100 μm thickness.

(Negative Electrode)

As to a negative electrode, an In foil of 9 mm diameter and 0.1 mm thickness was used.

(Production of all-Solid-State Secondary Cell)

The resulting positive electrode, solid electrolyte ($75Na_2S-25P_2S_5$) and negative electrode were layered in this order and the resulting layered product was sandwiched using stainless steels as a positive electrode collector and a negative electrode collector followed by pressing to give an all-solid-state secondary cell. The resulting all-solid-state secondary cell was subjected to the following charge-discharge test.

Charge-discharge condition: under room temperature, current density 0.013 mA/cm$^2$ and potential range 0 to 3 V (vs. Na)

Figure 10:
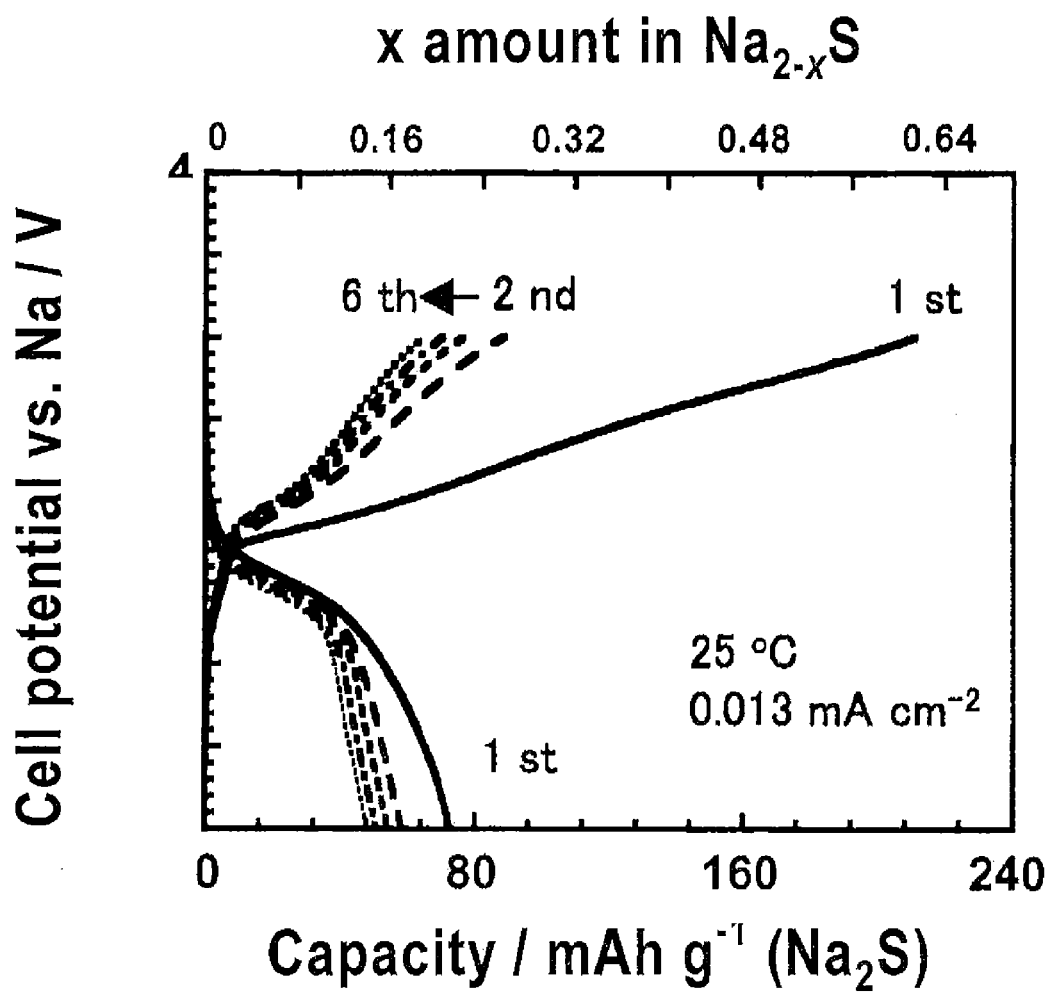
FIG. 10 is a charge-discharge curve of the all-solid-state secondary cell of Example 1.

A charge-discharge curve of the resulting all-solid-state secondary cell is shown in FIG. 10. From FIG. 10, the resulting all-solid-state secondary cell showed the capacity of about 200 mAh/g in the first charge. Even in the second charge and thereafter, the capacity of about 80 mAh/g was noted and the resulting all-solid-state secondary cell had a sufficient capacity.

Comparative Example 1

$Na_{0.44}MnO_2$ as a positive electrode active material, Glass ceramics made by $75Na_2S-25P_2S_5$ of Example 1 as an electrolyte and acetylene black as a conductive agent were weighed in the ratio by weight of 40:60:6 (total weight: 15 mg) followed by mixing and pressing to give a positive electrode.

$Na_{0.44}MnO_2$ was prepared as follows. Firstly, $Na_2CO_4$ and $Mn_2O_3$ were weighed in a mole ratio of 0.55:1. $Na_2CO_4$ and $Mn_2O_3$ were mixed in a mortar for 30 minutes. The mixture was pressed to make into pellets and burned at 800° C. for 12 hours. The resulting burned product was subjected to the same mechanical milling treatment as in Example 1 to give $Na_{0.44}MnO_2$.

As to a solid electrolyte layer, the same one as in Example 1 was used.

As to a negative electrode, such a one where metal sodium was precipitated onto stainless steel as a collector during the initial charge stage was used.

Production of an all-solid-state cell was conducted in the same manner as in Example 1 except the use of the above positive electrode, solid electrolyte layer and negative electrode.

Figure 11:
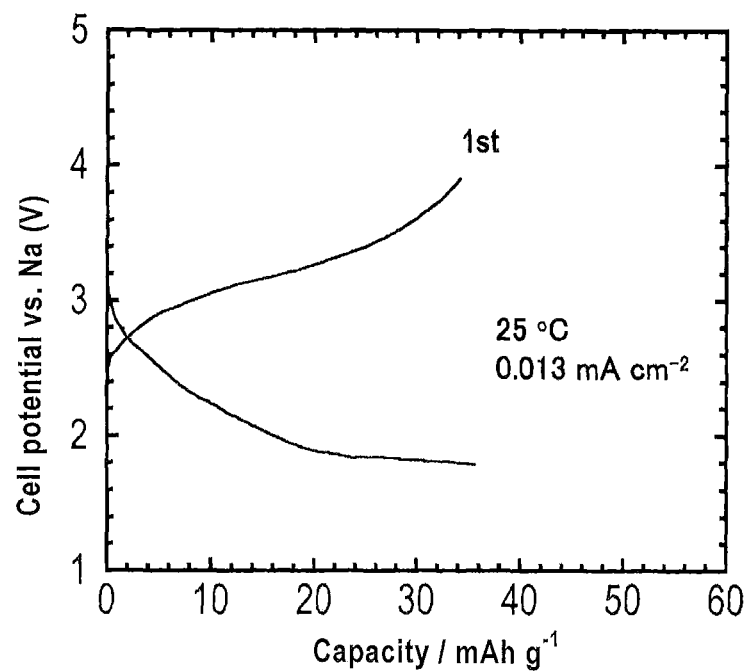
FIG. 11 is a charge-discharge curve of the all-solid-state secondary cell of Comparative Example 1.

A charge-discharge curve of the resulting all-solid-state secondary state is shown in FIG. 11. From FIG. 11, the resulting all-solid-state secondary cell showed the capacity of about 36 mAh/g in the first charge and, as compared with the cell of Example 1, the capacity was apparently low.

Example 2

$Na_2S$ as a positive electrode active material, acetylene black (HS-100 manufactured by Denki Kagaku Kogyo) as a conductive agent and Glass ceramics made by the above $75Na_2S-25P_2S_5$ as a solid electrolyte were weighed in the ratio of 25:25:50% by weight (total weight: 4.8 mg).

The positive electrode active material was subjected to a mechanical milling treatment for 10 hours at the revolving velocity of 230 rpm in dehydrated toluene (The device used for the treatment was the same as that in Example 1). After the conductive agent was added to the positive electrode active material treated as such, the mixture was subjected to a mechanical milling treatment for 10 hours at the revolving velocity of 370 rpm. The resulting two-ingredient mixture was subjected to a mechanical milling together with the solid electrolyte for 30 minutes at the revolving velocity of 300 rpm. The resulting three-ingredient mixture was pressed to give a positive electrode.

(Negative Electrode)

Sn as an negative electrode active material and Glass ceramics made by the above $75Na_2S-25P_2S_5$ as a solid electrolyte were weighed in the ratio of 70:30% by weight (total weight: 42.1 mg).

The negative electrode active material and the conductive agent were mixed for 10 minutes in a mortar. The resulting two-ingredient mixture was pressed to give a negative electrode.

(Production of all-Solid-State Secondary Cell)

An all-solid-state secondary cell was produced from the resulting positive electrode, solid electrolyte layer $75Na_2S-25P_2S_5$) and negative electrode according to the same manner as in Example 1. The resulting all-solid-state secondary cell was subjected to the following charge-discharge test.

Charging-discharging condition: under room temperature, current density 0.013 mA/cm$^2$ and potential range 0 to 3 V (vs. Na—Sn)

Figure 12:
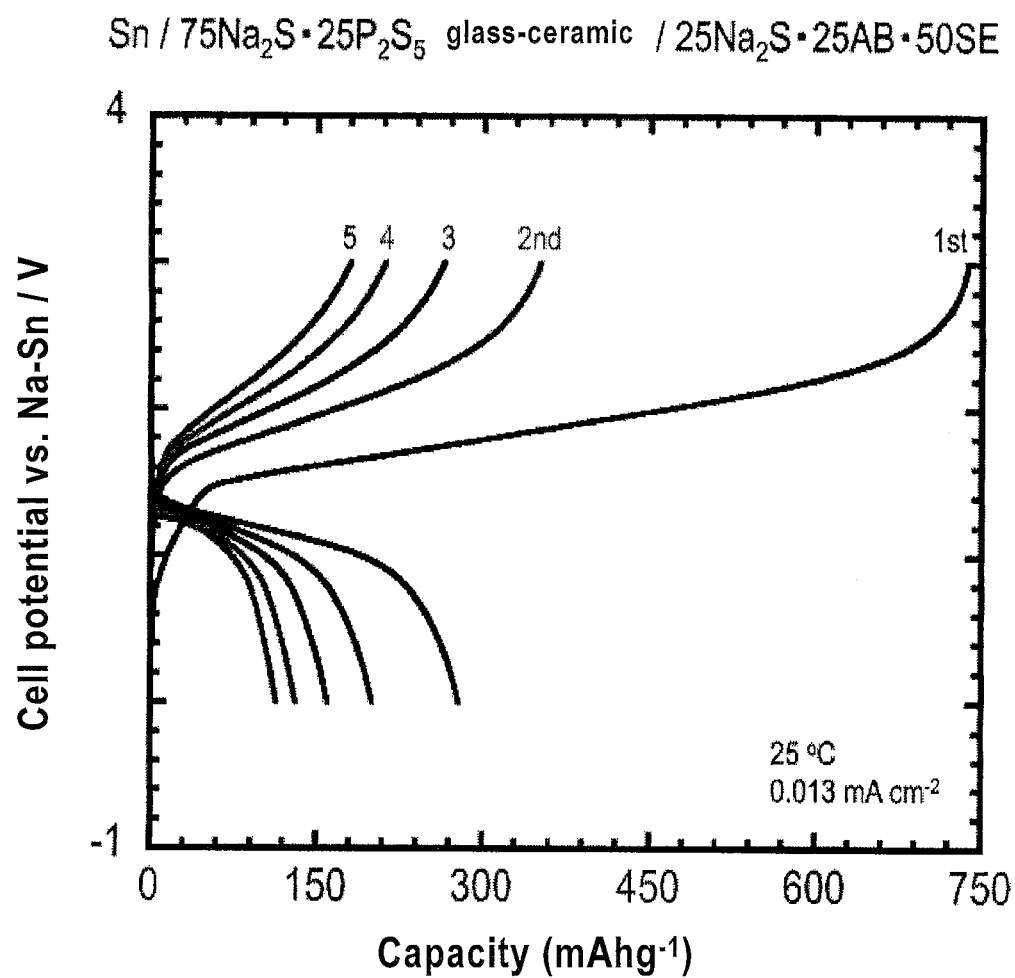
FIG. 12 is a charge-discharge curve of the all-solid-state secondary cell of Example 2.

A charge-discharge curve of the resulting all-solid-state secondary cell is shown in FIG. 12. From FIG. 12, the resulting all-solid-state secondary cell showed the capacity of about 750 mAh/g in the first charge. Even in the second charge and thereafter, the capacity of about 300 mAh/g was noted and the resulting all-solid-state secondary cell had a sufficient capacity.

What is claimed is:

1. An all-solid-state secondary cell comprising at least a positive electrode, a negative electrode and a solid electrolyte layer which is positioned between the positive electrode and the negative electrode, wherein:
    the positive electrode contains a positive electrode active material consisting of a $Na_2S_x$, wherein x=1 to 8, and the solid electrolyte layer contains an ion conductive glass ceramics having the formula $Na_2S-P_2S_5$,
    wherein the $Na_2S$ of the solid electrolyte layer is contained in an amount from 70 to 75 mole %, and
    wherein the ion conductive glass ceramics has a state where crystal parts are dispersed in the glass ingredient of an amorphous state and the crystal parts contain tetragonal $Na_3PS_4$.

2. The all-solid-state secondary cell of claim 1, wherein the $Na_2S_x$ is $Na_2S$.

3. The all-solid-state secondary cell of claim 1, wherein the crystal parts are contained in an amount of 50% by weight or more to the ion conductive glass ceramics as a whole.

4. The all-solid-state secondary cell of claim 1, wherein the positive electrode further contains $Na_2S-M_xS_y$ to be used for the solid electrolyte layer and the positive electrode active material is contained in an amount of within a range of 10 to 90% by weight in the positive electrode.

5. The all-solid-state secondary cell of claim 1, wherein the negative electrode contains a $Na_2S-M_xS_y$ used in the solid electrolyte layer and Sn.

* * * * *